United States Patent [19]

Carlson

[11] Patent Number: 5,146,356
[45] Date of Patent: Sep. 8, 1992

[54] ACTIVE MATRIX ELECTRO-OPTIC DISPLAY DEVICE WITH CLOSE-PACKED ARRANGEMENT OF DIAMOND-LIKE SHAPED

[75] Inventor: Allan I. Carlson, Briarcliff Manor, N.Y.

[73] Assignee: North American Philips Corporation, New York, N.Y.

[21] Appl. No.: 650,147

[22] Filed: Feb. 4, 1991

[51] Int. Cl.⁵ .................. G02F 1/1343; G02F 1/1335
[52] U.S. Cl. ........................................ 359/59; 359/61; 359/68; 359/87
[58] Field of Search ............... 350/333, 334, 332, 336; 359/87, 68, 59, 61

[56] References Cited

U.S. PATENT DOCUMENTS

| | | | |
|---|---|---|---|
| 4,373,784 | 2/1983 | Nonomura et al. ................ | 350/336 |
| 4,761,058 | 8/1988 | Okubo et al. .................... | 350/331 T |
| 4,778,257 | 10/1988 | Takamatsu et al. ............... | 350/333 |
| 4,811,003 | 3/1989 | Strathman et al. ............ | 350/336 X |
| 4,907,861 | 3/1990 | Muto .................... | 350/336 |
| 4,922,240 | 5/1990 | Duwaer ................... | 350/333 X |
| 4,986,637 | 1/1991 | Yamaguchi .................. | 350/339 F |

FOREIGN PATENT DOCUMENTS

| | | | |
|---|---|---|---|
| 61-254928 | 11/1986 | Japan ..................... | 359/59 |
| 63-142330 | 6/1988 | Japan . | |
| 64-79728 | 3/1989 | Japan . | |

Primary Examiner—Stanley D. Miller
Assistant Examiner—Ron Trice
Attorney, Agent, or Firm—John C. Fox

[57] ABSTRACT

An active matrix liquid crystal display device has diamond-shaped pixels arrayed in a close-packed arrangement, and interconnected by row and column electrodes which zigzag between the pixels, each column electrode extending between and being common to two columns of pixels and their associated thin film switches, and the column electrode-switch connections alternating sequentially between pixel columns.

13 Claims, 4 Drawing Sheets

ACTIVE MATRIX ELECTRO-OPTIC DISPLAY DEVICE WITH CLOSE-PACKED ARRANGEMENT OF DIAMOND-LIKE SHAPED

BACKGROUND OF THE INVENTION

This invention relates to an active matrix electro-optic display device such as a liquid crystal display (LCD) device, having an array of display cells defined by an array of pixel electrodes, an array of row and column electrodes, and an array of switches inter-connecting the pixel electrodes and the row and column electrodes.

Liquid crystal devices currently being developed for television applications are of the active matrix type in which an array of display cells is defined by an array of pixel electrodes on one wall of the device, and in which the display cells are controlled by a matrix of row and column electrodes connected to the pixel electrodes through switches, e.g., thin film transistors.

In one preferred form of such an active matrix liquid crystal display device, known as a twisted nematic display device, alignment layers are oriented on the inner walls of the device to have mutually orthogonal alignment directions, thereby aligning the adjacent molecules of a nematic liquid crystal and imparting a 90 degree twist to the liquid crystal from one wall to the other.

In operation, incoming light to be modulated enters the device through a polarizer having its polarization direction aligned with the adjacent alignment layer. This linearly polarized light is rotated 90 degrees as it travels through the liquid crystal, and exits the device through an analyzer having its polarization direction aligned with the adjacent alignment layer. Upon application of a voltage sufficient to untwist the liquid crystal molecules, the light is no longer rotated and is thus blocked by the analyzer, giving a dark "on" condition. Application of intermediate voltage values result in intermediate or "grey" levels.

One consideration in designing the pixel array is the amount of brightness which is desired for the display. Since the brightness is related to the amount of light transmitted by the device, it is important to minimize the area covered by non-transmissive features such as the switches and the row and column electrodes. The usual practice is to render the entire inter-pixel area non-transmissive in order to enhance the contrast of the display. The brightness of such displays is thus directly related to the percentage of the display area which is occupied by pixels.

Another consideration in designing the pixel array is the resolution desired for the display. Pixels in current displays are arranged in an orthogonal pattern ("manhattan layout") with the row address lines parallel to the x axis of the display and the column address lines parallel to the y axis (FIG. 1). In some displays, the rows may be staggered to produce a higher effective horizontal resolution (FIG. 2).

In Japanese patent laid open 63-142330, an active matrix liquid crystal display device is described which has a close-packed array of hexagonal-shaped pixels, said to have increased display area due to the smaller periphery per surface area of the hexagonal pixels over square or rectangular pixels, leading to shorter row and column lengths on the periphery of the pixels, as well as the elimination of longitudinal and transverse stripe-shaped artifacts which occur with square and rectangular pixels. However, the row and column lines are actually longer in this hexagonal design since they zigzag. Also, the increased area-to-periphery ratio advantage of this design is largely nullified because the row and column lines are parallel to each other over ⅓ of the periphery of each pixel.

In European patent application no. 0 302 653, an active matrix liquid crystal display device is described in which pixels of first, second and third colors are centered on the corners of first, second and third overlapping rectangles having a common diagonal, this arrangement said to provide the same display quality for horizontal, vertical and oblique lines, as well as the elimination of stripe-shaped artifacts, regardless of the color of the display.

In Japanese patent application no. 62-236171, which corresponds to Japanese patent laid open 64-79728, a liquid crystal display said to have high contrast has scanning (row) electrodes of a zigzag pattern and signal (column) electrodes of a straight pattern in combination with a rhombic pattern of picture elements.

OBJECTS AND SUMMARY OF THE INVENTION

It is an object of the invention to provide a pixel array for an active matrix electro-optic display device which increases the effective resolution of the display device.

It is another object of the invention to simultaneously increase (maximize) the effective resolution and the light transmission of the display device.

It is another object of the invention to provide such an array in which edge effects such as stripe-shaped artifacts are reduced or eliminated.

It is another object of the invention to provide a compact arrangement of row and column electrodes for interconnecting such an array.

It is another object of the invention to provide such a compact arrangement which includes storage capacitors.

In accordance with the invention, an active matrix electro-optic display device comprises an electro-optic material sandwiched between opposing walls, at least one of which is transparent, an array of pixels on one of the walls, a thin film switch associated with each pixel electrode, and an array of row and column electrodes interconnecting the pixel electrodes via the switches, the pixels being diamond-like shaped and arrayed in a close-packed arrangement;

characterized in that each column electrode extends between and is common to two columns of pixel electrodes and their associated switches; and the column electrode-switch connections alternate sequentially between pixel columns.

As used herein, the term "diamond-like" means a parallelogram or approximate parallelogram, oriented to have its opposing corners aligned horizontally and vertically, along the x and y axes of the display, respectively.

In accordance with a preferred embodiment of the invention, the row electrodes comprise legs extending between adjacent sides of the pixel electrodes and join (at approximately 90°, for example) near the corners of the pixel electrodes, thereby following a zigzag pattern between the rows of pixel electrodes.

In accordance with another preferred embodiment of the invention, the column electrodes also follow a zigzag pattern between the columns of pixel electrodes.

In accordance with yet another preferred embodiment of the invention, the row and column electrodes cross over along adjacent sides of the pixel electrodes, most preferably at substantially the mid-points of the adjacent sides.

In accordance with still another preferred embodiment, the switches are dual gate thin film transistors.

DESCRIPTION OF THE PREFERRED EMBODIMENTS

Figure 1:
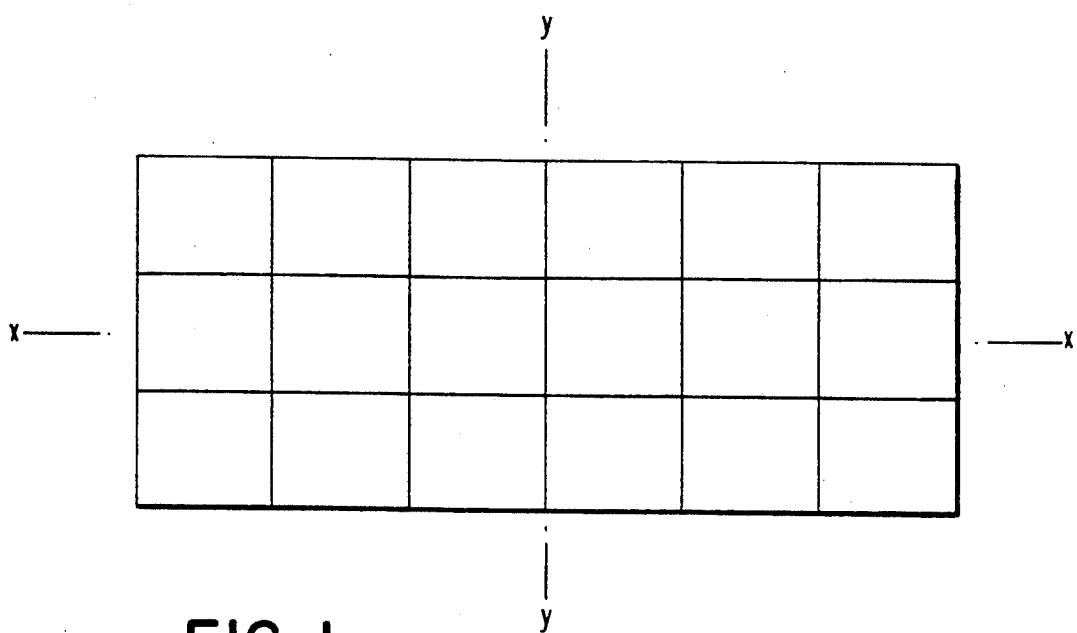
FIG. 1 is a diagrammatic plan view of one arrangement of pixels in a matrix LCD of the prior art.
Figure 2:
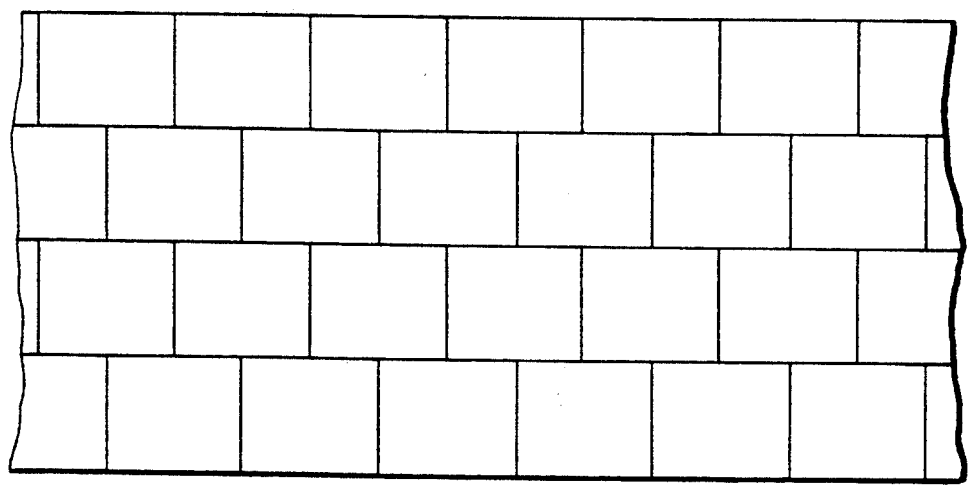
FIG. 2 is a diagrammatic plan view of another arrangement of pixels in a matrix LCD of th prior art.
Figure 3:
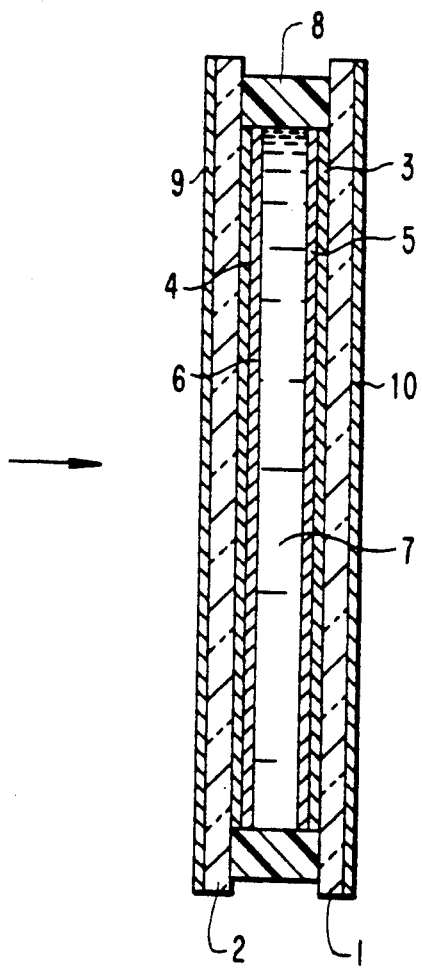
FIG. 3 is a diagrammatic cross section of a matrix LCD of the prior art.

A cross section of a twisted nematic LCD of the prior art for operation in the transmissive mode is shown in FIG. 3 Of two glass supporting plates 1 and 2, supporting plate 1 carries on its inner surface a pattern of row and column electrodes, and an array of pixel electrodes and associated TFTs, illustrated schematically as layer 3. Supporting plate 2 carries a transparent counterelectrode 4. Orienting layers 5 and 6 are present on the inner surfaces of the layer 3 and the counter electrode 4, these orienting layers formed, for example, by vapor deposition of silicon monoxide (SiO) at an oblique angle to the normal of the surfaces. Another common method of producing such layers is to rub polyimide layers in the desired direction of orientation. A nematic liquid crystal material 7, such as the proprietary formulation known as ZLI 84-460, manufactured by E. Merck of Darmstadt, West Germany, containing a chiral addition of, for example, n-cyano-4'-(2-methyl)-isobutyl-biphenyl (obtainable as CB15 from BDH Chemicals, Poole, England) is present between the supporting plates. The spacing between the plates is typically in the range of about 6-8 microns, and is maintained by spacer beads (not shown) which are distributed randomly over the surfaces of the plates. A sealing gasket 8 joins the plates together.

The silicon monoxide layers each exhibit a direction of orientation along which the adjacent liquid crystal molecules tend to align themselves. Because these molecules also tend to align with one another, a mutually orthogonal arrangement of the silicon monoxide alignment directions results in the liquid crystal molecules undergoing a rotation of approximately 90° across the cell thickness. The chiral additive determines the direction of twist of the liquid crystal molecules, CB15 imparting a counter-clockwise twist.

The outer surfaces of the supporting plates 1 and 2 furthermore each carry a linear polarizer. Polarizer 9 intercepts the incident light, indicated by the arrow in the drawing, and analyzer 10 intercepts the light transmitted by the device.

With a mutually orthogonal orientation of polarizer and analyzer, linearly polarized incident light is rotated 90° by the LC cell and transmitted by the analyzer. Upon application of a voltage, the LC molecules untwist, and light is blocked, the amount dependent on degree of twist, which is in turn dependent on the magnitude of the voltage applied.

Figure 4:
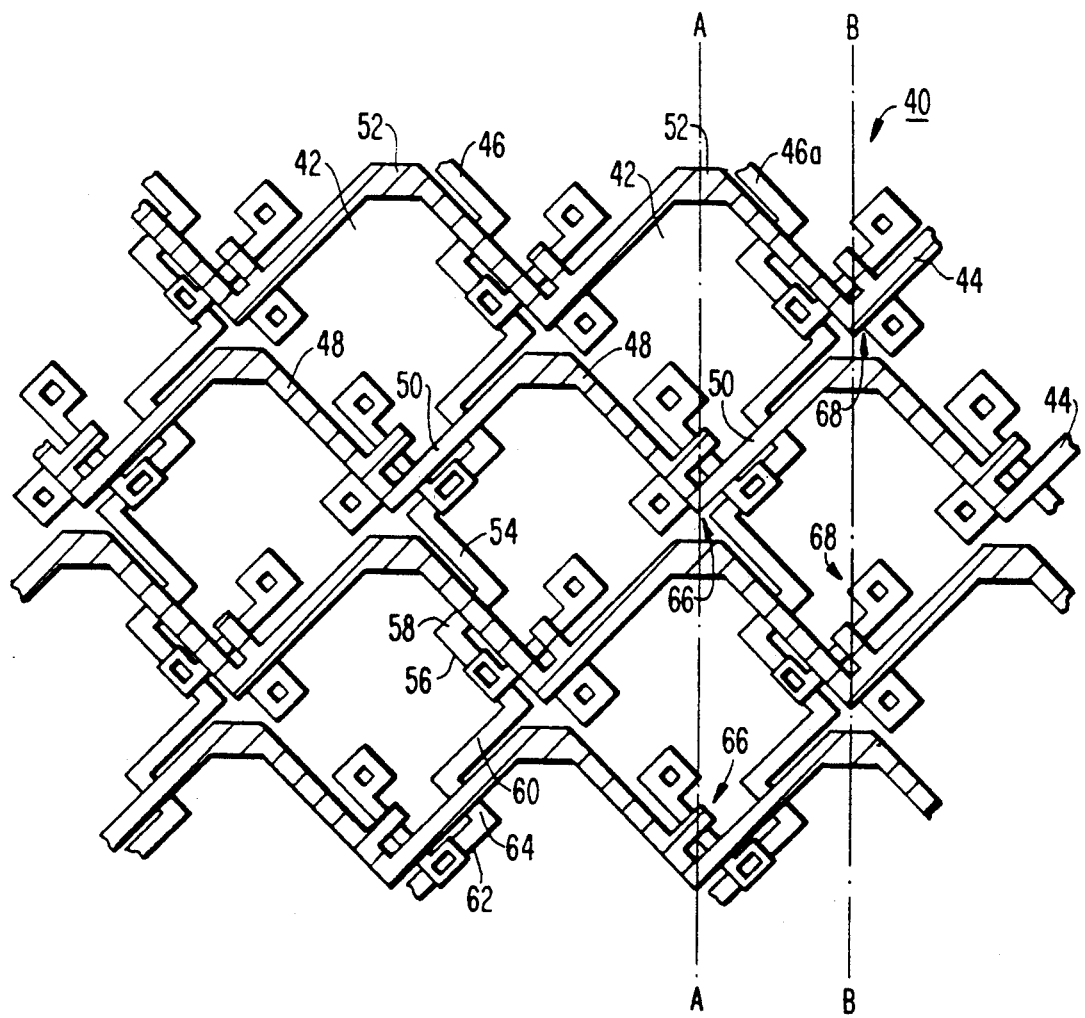
FIG. 4 is a diagrammatic plan view of one embodiment of a pixel arrangement for an active matrix LCD of the invention.

Referring now to FIG. 4, a diagrammatic plan view of one embodiment of a pixel arrangement 40 for an active matrix LCD of the invention, there is shown a close-packed array of diamond-like shaped pixel areas 42, defined by zig-zag shaped row and column electrodes, 44 and 46, respectively. The row electrodes have legs 48 and 50, which extend parallel to adjacent sides of the pixel electrodes, and join at their ends to form corners having an angle of approximately 90 degrees. The exact angle depends on the aspect ratio of the pixels, which is selected to give the required vertical and horizontal resolution. At the upper corners 52, additional electrode material may be present, which, together with another electrode and an intervening dielectric layer (not shown) forms additional area for a storage capacitor. The area is chosen to achieve sufficient capacitance to substantially offset leakage currents.

In this embodiment, the column electrodes 46 are also formed from legs extending parallel to adjacent sides of the pixel electrodes, but unlike the legs 48 and 50 of the row electrodes 44, which extend along the entire side of the pixel electrode, the legs 54 and 56, and 60 and 62, are each connected by cross-overs 58 and 64, respectively, at about the mid-point of the sides of the pixels.

Each column electrode 46 is common to two adjacent columns of pixel electrodes, for example, columns A and B. For each column electrode 46, connections via thin film switches to the pixel electrodes are made alternately to the pixels of adjacent columns. For example, switches 66 interconnect column electrode 46a with pixels in column A, and switches 68 interconnect the same column electrode 46a with pixels in column B.

Figure 5:
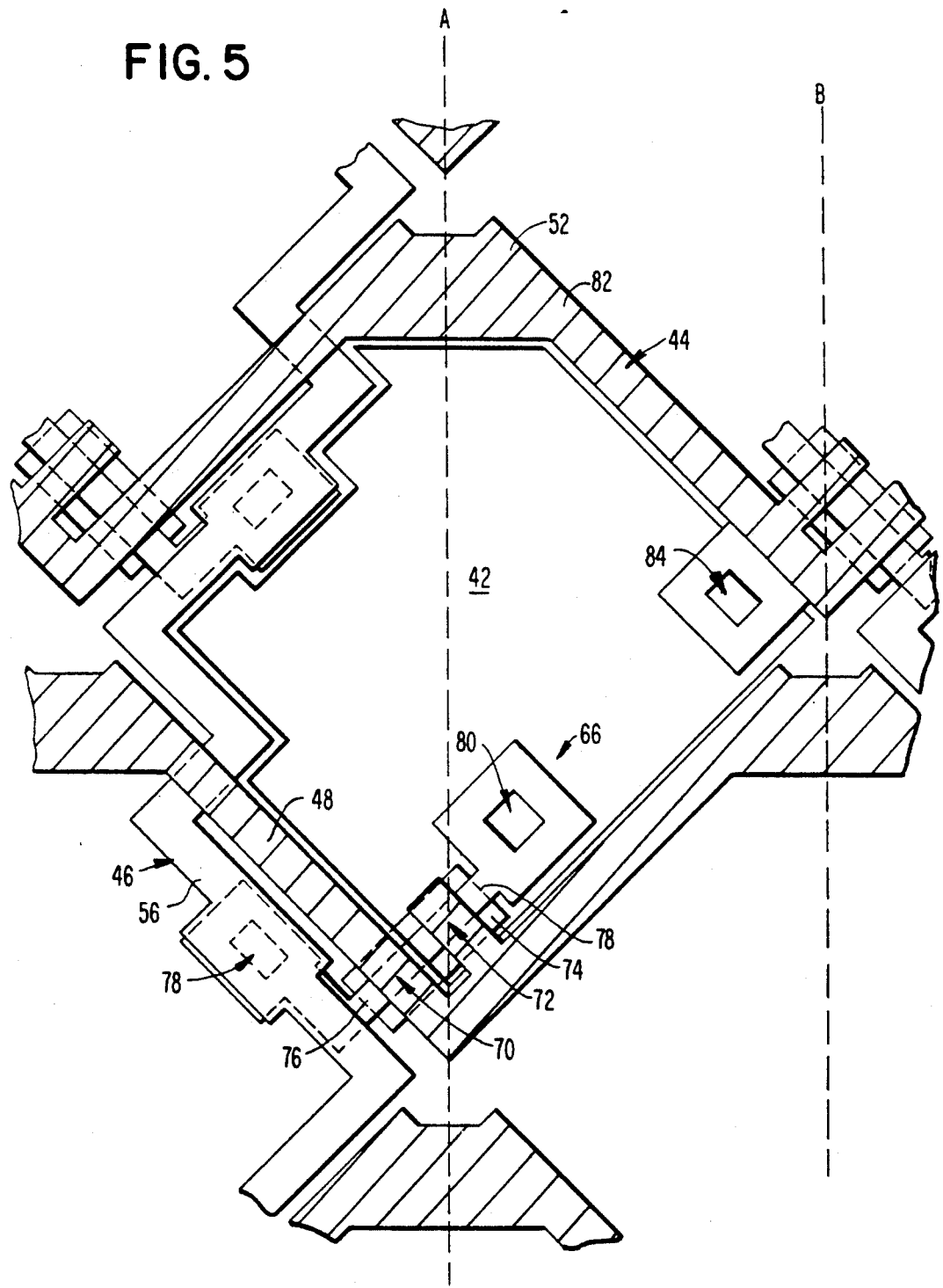
FIG. 5 is an enlargement of a portion of the arrangement of FIG. 4, showing one pixel and portions of the surrounding structure.

Referring now to FIG. 5, a more detailed view of a pixel 42 of FIG. 4 is shown, together with its surrounding structure. Thin film transistor 66 is a dual gate structure, in which one of the gates 70 is defined by that portion of leg 48 of row electrode 44 which overlies the polsilicon island 74 that forms the source, channel and drain regions of the thin film transistor. The other gate 72 is an extension of leg 50 of row electrode 44, extending parallel to leg 48. Source electrode 76 is electrically connected to column electrode 46 at 78, while drain electrode 78 is electrically connected to the pixel electrode 42 at 80. A light shield 86 overlies the light sensitive areas of the thin film transistor.

A portion of row electrode 44, including the expanded region at the corner 52, together designated as region 82, overlies another electrode approximately coextensive with area 82, and an intervening dielectric layer (not shown), to form a storage capacitor, which is connected to pixel electrode 42 at 84.

As perhaps best seen from FIG. 4, the thin film transistors as well as the display cells as a whole have mirror sysmmetry about the vertical axis. Thus, if switches 66 were rotated clockwise by 90 degrees, and turned over, they would have the same orientation as switches 68.

The invention has been described in terms of a limited number of embodiments. Other embodiments and variations of embodiments within the scope of the invention will become apparent to those skilled in the art. For example, the switches may be in form of two terminal devices, such as diodes or MIMs, as well as three terminal devices, such as thin film transistors. The liquid crystal device may operate in the reflective mode as well as the transmissive mode. Other liquid crystal materials may be used, such as supertwist and ferroelectric liquid crystal materials, as well as other electro-optic materials, such as electroluminescent and plasma discharge layers.

What is claimed is:

1. An active matrix electro-optic display device comprising an electro-optic material sandwiched between opposing walls, at least one of which is transparent, on one of the walls: an array of pixel electrodes; a switch associated with each pixel electrode, and an array of row and column electrodes interconnecting the pixel electrodes via the switches, the pixel electrodes being diamond-like shaped and arrayed in a close-packed arrangement;

characterized in that: each column electrode extends between and is common to two columns of pixels and their associated switches; and the column electrode-switch connections alternate sequentially between pixel columns.

2. The device of claim 1 in which the row electrodes comprise legs extending between adjacent sides of the pixel electrodes and in close proximity near the corners of the pixel electrodes, thereby following a zig-zag pattern between the rows of pixel electrodes.

3. The device of claim 2 in which the column electrodes follow a zig-zag pattern between the columns of pixel electrodes.

4. The device of claim 3 in which the row and column electrodes cross over along adjacent sides of the pixel electrodes.

5. The device of claim 4 in which cross-over occurs substantially at the mid-points of the adjacent sides.

6. The device of claim 1 in which the switches comprise thin film transistors having source, drain and channel regions, and source, drain and gate electrodes.

7. The device of claim 2 in which the source electrode of each switch is connected to a column electrode, the gate electrode is a portion of a row electrode, and the drain electrode is connected to a pixel electrode.

8. The device of claim 6 in which the source, drain and channel regions of the thin film transistor switch comprise polycrystalline silicon.

9. The device of claim 8 in which each switch also comprises a second gate electrode extending from the row electrode.

10. The device of claim 9 in which the second gate electrode extends from one leg of the row electrode near and in a direction parallel to the gate electrode portion of an adjoining leg of the row electrode.

11. The device of claim 8 in which at least a portion of the row electrode adjacent to the top sides of a pixel comprise one electrode of a storage capacitor for the pixel.

12. The device of claim 1 in which the adjacent sides of the pixels are at approximately right angles to one another.

13. The device of claim 1 in which the electro-optic material is a liquid crystal material.

* * * * *